Sept. 21, 1965 A. J. CHRISTMAN 3,208,074
APPARATUS FOR COLLECTING GEOPHYSICAL DATA
Filed Nov. 13, 1962 4 Sheets-Sheet 1
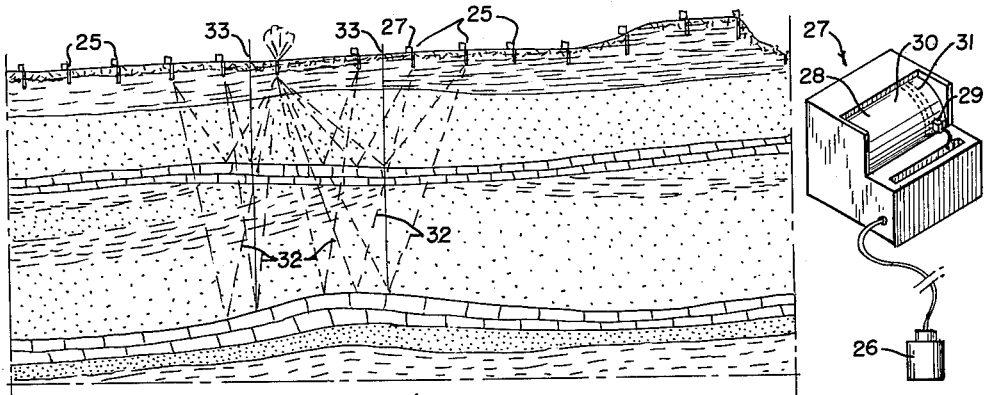
Fig. 1
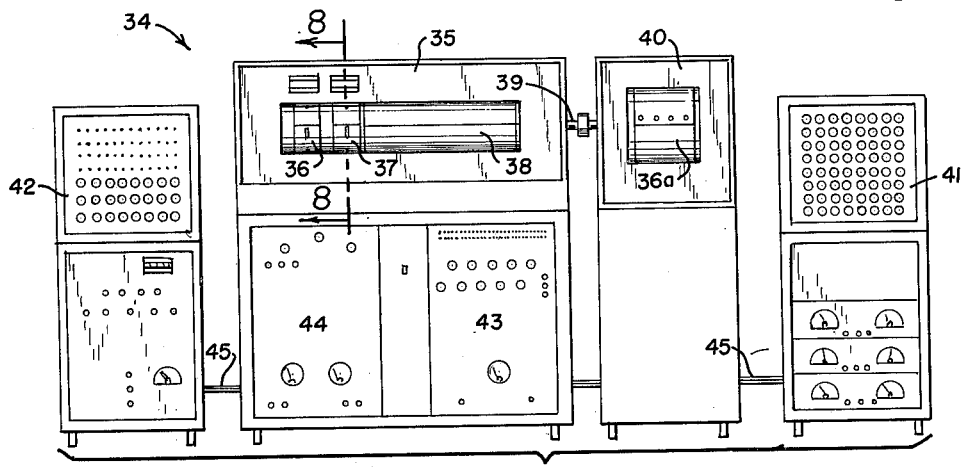
Fig. 2
Fig. 3
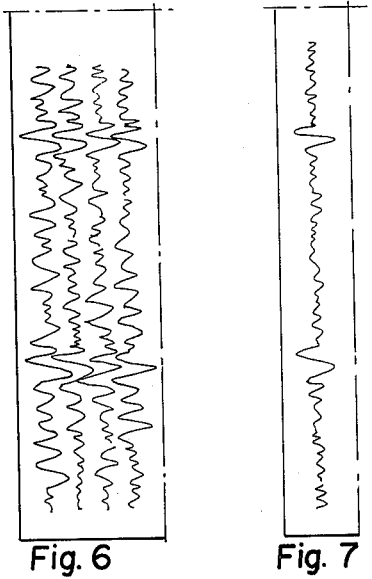
Fig. 6  Fig. 7
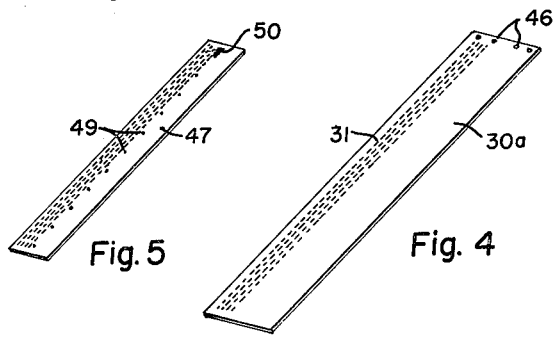
Fig. 5  Fig. 4
INVENTOR.
Albert J. Christman
BY WHITEHEAD, VOGL & LOWE
PER Frank C. Lowe
ATTORNEYS Sept. 21, 1965     A. J. CHRISTMAN     3,208,074
APPARATUS FOR COLLECTING GEOPHYSICAL DATA
Filed Nov. 13, 1962     4 Sheets-Sheet 2
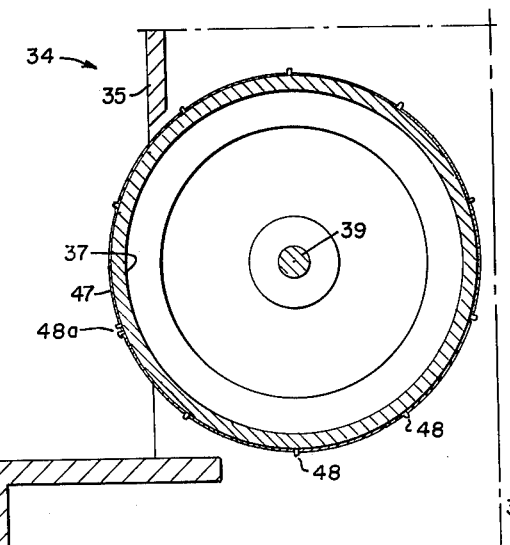
Fig. 8
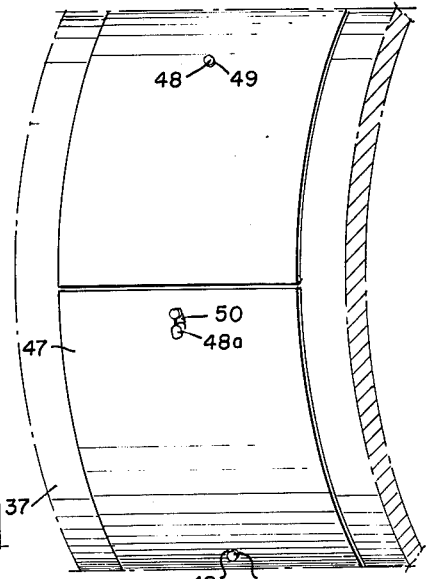
Fig. 9
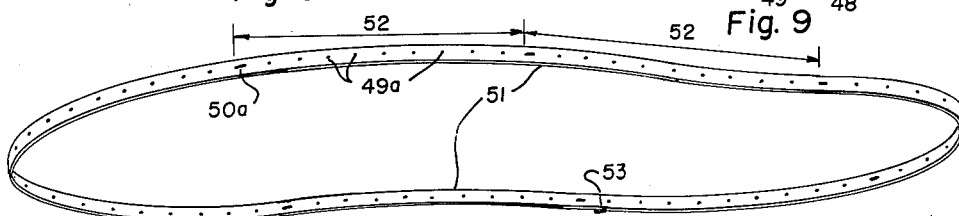
Fig. 10
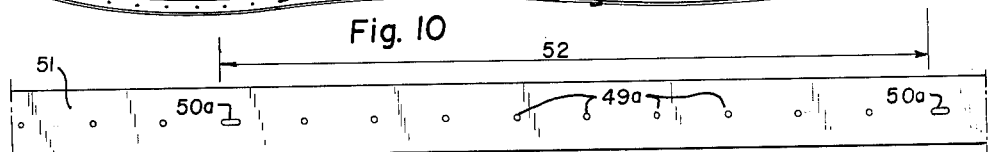
Fig. 11
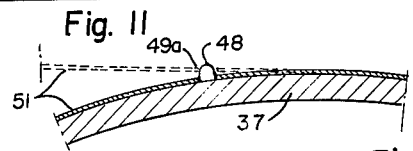
Fig. 13
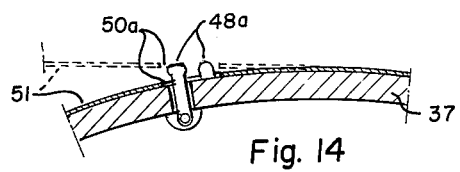
Fig. 14
Fig. 12
INVENTOR.
Albert J. Christman
BY WHITEHEAD, VOGL & LOWE
PER *Frank E. Lowe*
ATTORNEYS

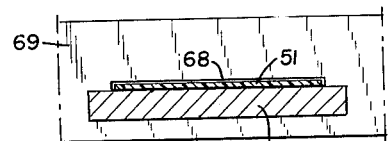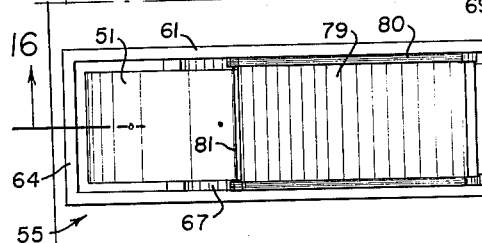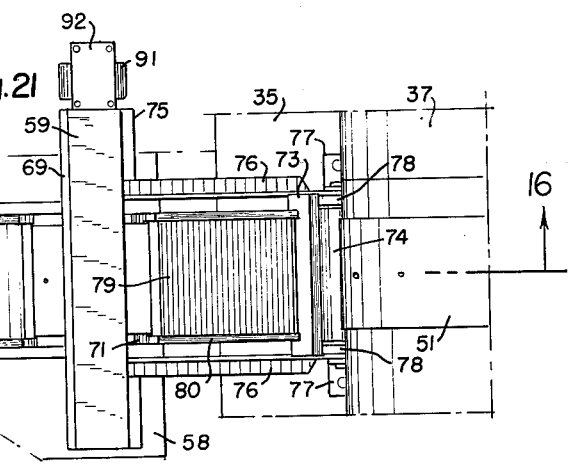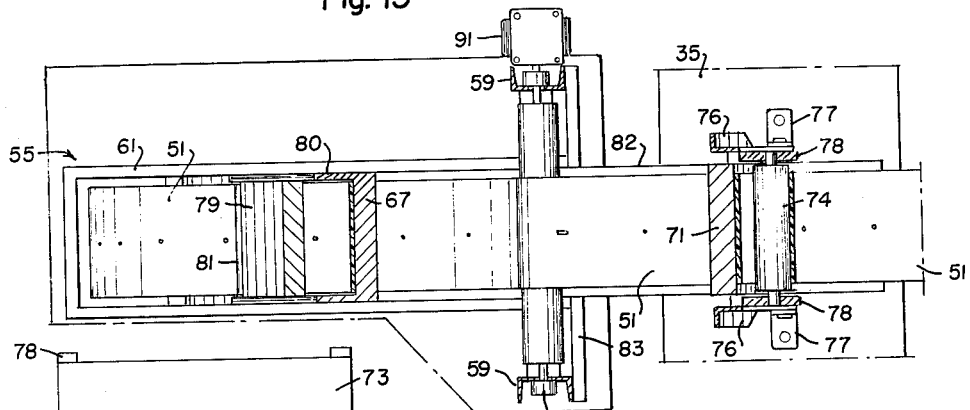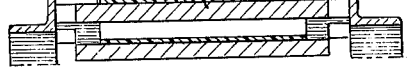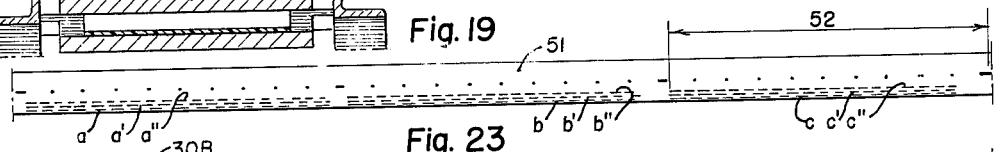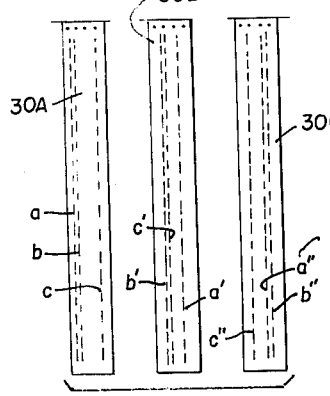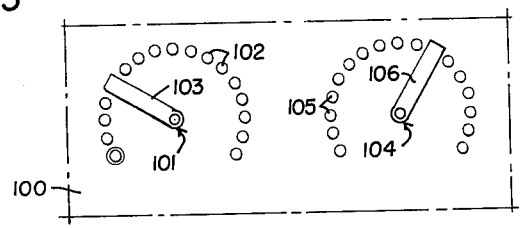
Fig. 24
INVENTOR.
Albert J. Christman
BY WHITEHEAD, VOGL & LOWE
ATTORNEYS

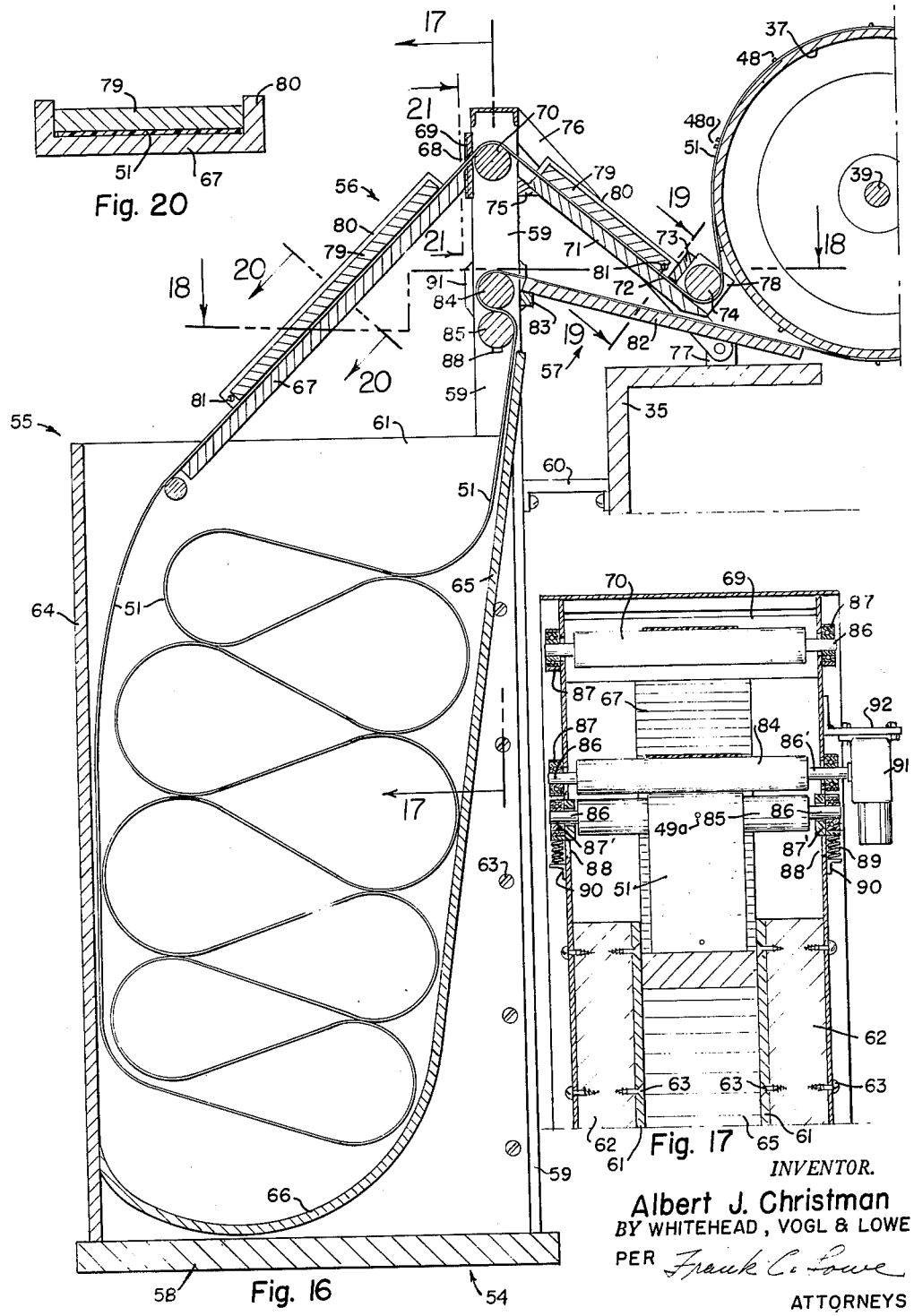

United States Patent Office 3,208,074
Patented Sept. 21, 1965

1

3,208,074
APPARATUS FOR COLLECTING
GEOPHYSICAL DATA
Albert J. Christman, Lakewood, Colo., assignor to Continental Oil Company, Ponca City, Okla., a corporation of Delaware
Filed Nov. 13, 1962, Ser. No. 237,048
5 Claims. (Cl. 346—33)

This invention relates to improvements in geophysical data processing systems of the type which prepares for analysis, and analyzes, the information on magnetic tapes obtained from seismic field units, and more particularly to the transcribing of magnetic tape field records onto transfer tapes for further processing and analysis. The primary object of the invention is to provide a novel and improved transfer method and an improved transfer tape for a geophysical data processing system which facilitates an organized collection and rearrangement of diverse series of field records into selected correlated groups. As such the invention will be hereinafter referred to as a method for collecting geophysical data and a collector-transfer tape for a geophysical data processing system, or simply as a data collecting method and a collector tape.

The improved collecting method and collector tape construction is especially, though not exclusively, adapted to be used with conventional geological data processing equipment which correlates seismic information obtained from field units. For example, as where the reflections of a single shot are simultaneously recorded at a series of stations, or a group of shots, made at a series of stations, are recorded in a predetermined sequence. Therefore, to exemplify the advantageous uses of the collector tape, it will be described with respect to a typical program of seismic operations, it being understood that the invention is not restricted to such specific application and use so described.

A typical field exploration program of underground structure by seismic methods involves the selection of a sequence of stations suitably spaced apart, preferably in common alignment. The distances between the stations and their elevations are first established. Next, test holes are drilled below the overburden and to a selected depth. A seismic recorder, a geophone, is located at each station with its recording mechanism being timed to record simultaneously and in unison with recorders located at the other stations. The operation is thus, essentially, to make a shot by detonating an explosive at one station and recording the seismic reflections at each of the other stations; and then, to make similar shots at the other stations in a sequence. As many as twenty-five or more stations may be involved in a single operation to obtain a large number of records at each station.

A preferred and common form of a seismic recording mechanism uses a wide magnetic tape mounted upon a revolving drum. The tape and drum are so proportioned as to permit a complete seismic reflection record to be obtained upon a trace within a single revolution of the drum and along a single circumferentially disposed path or longitudinal channel on the tape. The width of the tape is ordinarily such as to provide at least twenty-four such channels to thereby hold all of the seismic reflection records of the test program which may be obtained from a given station.

The field data is subsequently processed by applying corrections for the time-lag of reflections in the earth due to weathering of surface rocks, elevation differences at the various stations, the normal moveout effects and spread configurations of the reflection patterns depending upon the distance between a shot and the recording geophone. The corrected data may then be recorded on an oscillographic drum to permit the reflection pattern to be viewed or, it may be recorded on a transfer tape for further processing.

One desired mode of analysis of field data is to compare all data which is obtained with respect to a given station or intermediate location where a common reflection point is located. Where several shots are made at stations adjacent to the reflection point, the recording geophones may be selectively spotted at other stations to produce the desired results. A method for obtaining data in this manner is disclosed in the United States Patent No. 2,732,906, issued to W. H. Mayne, on January 31, 1956.

When all of the data for a common reflection point is corrected and compared as by superposition or addition, erratic and insignificant indications on each record, such as the effect of noise and secondary reflections, are automatically cancelled and reflections from well defined underground strata, especially where the formations change, are emphasized and rendered clearly apparent.

Where a number of reflection points are selected on alignment and a series of shots are made with each shot providing information for several reflection points, a large amount of data can be quickly accumulated. The processing of this data can become complex, tedious and time consuming especially with conventional processing apparatus.

In essence, a conventional processing apparatus includes a first drum which is sized to correspond with the field seismic recorder drum to receive the field tape. This drum may be extended to also receive a transfer tape and a coordinate sheet for an oscillograph trace recorder, or a second drum may be used to hold the transfer tape and coordinate sheet. In either case the drums are interconnected to rotate together. The receiving and recording units, which pick up and duplicate the seismic traces, are operatively interlinked through corrective offsetting devices so that the information from the field tape is transmitted to the transfer tape or coordinate sheet with a slight, varying time delay which is sufficient to produce a corrected trace on the transfer tape or coordinate sheet.

To establish all corrected comparative data for a given reflection point on a single transfer tape, it may be necessary to include seismic traces at a dozen or more stations. Each field tape must be fed into the processing apparatus, one at a time. Each time the proper channel in which the selected trace lies must be located, it must then be zeroed in with the transfer tape and the controls on the corrective apparatus must be properly set. When one trace is transferred, the field tape is removed and another field tape is fed into the apparatus and the process repeated. When such information is obtained for a number of reflection points, each field tape must be set into and removed from the apparatus many times.

Because the operation is tedious and time consuming, there is a real and definite need for a quicker way of processing field data to group all traces relating to a common reflection point onto a single transfer tape. This need has been heretofore met by the use of an increased size apparatus which involves a group of field data drums, as many as a dozen if necessary, with each having an independent circuit system to correlate it with a selected channel on the transfer tape. In essence, such a machine is equivalent to a dozen separate machines with each operating independently of the other and with each requiring its own correction mechanisms. The expense of such machines is generally prohibitive for the ordinary geo-data processing organizations.

It was with such in view that the present invention was conceived and developed, and the invention comprises, in essence, a simplified method for the organized collection of correlated traces from groups of field seismic tapes, an extended and continuous transfer tape formed as a multi-stage unit and a containing and feeding apparatus therefor which may be used in combination with geo-data processing apparatus is especially adapted to permit groups of traces of field seismic tapes to be channeled together according to selected sequences and, at selected stages along the tape.

It follows that another object of the invention is to provide a novel and simplified method for processing the several traces in a multi-channeled seismic field tape or the like, including the transferring of corrected traces onto a transfer tape in a selected, single-channel sequence to thereby present the seismic data in an arrangement adapted to facilitate easy correlation of such traces with other comparative traces from other field tapes.

Another object of the invention is to provide a novel and simplified method for processing the several traces of a group of multi-channeled seismic field tapes including the steps of transferring corrected traces of each channel of each tape onto a transfer tape in a selected, single-channel sequence and in a predetermined arrangement with and alongside corrected traces of other field tapes to permit correlation of comparative traces from all of the field tapes.

Another object of the invention is to provide a novel and improved collector transfer tape which may be used with conventional geological data processing equipment for geophysical work, which is adapted to receive corrected traces from field tapes and position the traces thereon at selected predetermined locations so that subsequent analysis of the data can be made either through comparison of certain traces from a number of tapes or by addition of common traces on different field tapes to eliminate undesirable noise indications and accentuate true reflection data.

Another object of the invention is to provide a novel and improved collector transfer tape which is specifically adapted to receive processed data from all of the channels of each of a group of field tapes with the traces of the field tape channels being dispensed in selected channels at selected stages along the collector tape, whereby to facilitate and permit further comparison and analysis of the field data.

Another object of the invention is to provide a novel and improved data collecting arrangement for use with geo-data processing equipment which permits a number of traces from the channels of a field tape to be processed in a single sequential operation and with a minimum of handling of tapes and a minimum of setting adjustments of the equipment.

Another object of the invention is to provide a novel and improved collector transfer tape and an improved container and feeder mechanism associated therewith which is especially adapted to be used in combination with conventional geo-data processing equipment and the like as an accessory thereto, to permit the compilation of processed field data and information in diverse arrangements not conveniently practicable or extremely cumbersome to obtain with the geo-data processing equipment only.

Further objects of the invention are to provide a novel and improved collector transfer tape and an improved container and feeder mechanism therefor, as an accessory for geo-data processing equipment which is a neat, compact, easy-to-use, reliable and economical unit.

With the foregoing and other objects in view, all of which more fully hereinafter appear, my invention comprises certain constructions, combinations and arrangements of parts and elements as hereinafter described, defined in the appended claims and illustrated, in preferred embodiment, in the accompanying drawing, in which:

FIG. 1 is a diagrammatic view of underground earth structure with surface stations being located at selected positions for obtaining seismic information, and illustrating further, a shot being made at one station with broken lines indicating generally the path of the longitudinal seismic-wave and reflections thereof from certain strata which are picked up at other stations.

FIG. 2 is a diagrammatic view of a conventional seismic geophone and tape recording apparatus associated therewith.

FIG. 3 is an elevational view of a series of cabinets containing a conventional geo-data processing apparatus of a type which is especially adapted to be used in connection with the present invention.

FIG. 4 is an isometric view of one type of magnetic tape commonly used in connection with the apparatus illustrated at FIG. 2, and with the path of magnetic traces in certain channels on the tape being illustrated in broken lines.

FIG. 5 is an isometric view of a magnetic tape of another form which is especially adapted to be used as both a field tape and a transfer tape in the apparatus illustrated at FIG. 3, and with the magnetic traces of certain channels on this tape being indicated by broken lines.

FIG. 6 is a representative group of oscillographic traces of the type which may be obtained from correlated groups of processed data as from several channels of a transfer tape.

FIG. 7 is a diagrammatic view of an oscillographic trace which may be obtained from traces such as those illustrated at FIG. 6, as by addition of the traces to eliminate erratic indications of noise and secondary reflections and at the same time to emphasize indications of true seismic reflections.

FIG. 8 is a fragmentary sectional portion of the apparatus illustrated at FIG. 3, emphasizing particularly the tape receiving drum, as taken from the indicated line 8—8 at FIG. 3, but on an enlarged scale.

FIG. 9 is a fragmentary perspective view of a portion of the tape receiving drum illustrating a length of tape as being wound thereon in a conventional manner.

FIG. 10 is a perspective, somewhat diagrammatic view of a continuous extended collector transfer tape which is constructed according to the principles of the invention.

FIG. 11 is a plan view of the segment of the tape illustrated at FIG. 10, but on an enlarged scale.

FIG. 12 is a perspective fragmentary view similar to FIG. 9, but illustrating a fragment of the continuous tape, of FIG. 10, as being wound thereon.

FIG. 13 is a fragmentary sectional detail of a portion of the drum as taken from the indicated line 13—13 at FIG. 12, but on a greatly enlarged scale and with broken lines indicating the manner in which the tape will move onto and away from the drum.

FIG. 14 is a fragmentary sectional detail as taken from the indicated line 14—14 as indicated of FIG. 12, but on an enlarged scale and with broken lines indicating the manner in which the tape will move onto and away from the drum.

FIG. 15 is a plan view of an improved feeder-container arrangement for the collector tape illustrated at FIG. 10, and with a portion of the conventional processing apparatus at FIG. 3, being shown to illustrate the manner in which the feeder-container is positioned with respect to the apparatus.

FIG. 16 is a longitudinal sectional elevational view, as taken from the indicated line 16—16 at FIG. 15.

FIG. 17 is a transverse sectional elevational view as taken from the indicated line 17—17 at FIG. 16.

FIG. 18 is a sectional plan view as taken from the indicated line 18—18 at FIG. 16.

FIG. 19 is a fragmentary sectional detail as taken from the indicated line 19—19 at FIG. 16, but on an enlarged scale.

FIG. 20 is a fragmentary sectional detail as taken from the indicated line 20—20 at FIG. 16, but on an enlarged scale.

FIG. 21 is a fragmentary sectional detail as taken from the indicated line 21—21 at FIG. 16, but on an enlarged scale.

FIG. 22 is a plan view of a group of field tapes with indicated traces in selected channels as shown in broken lines.

FIG. 23 is a fragmentary portion of the improved collector tape with indicated traces being shown thereon in broken lines.

FIG. 24 is a fragmentary portion of the apparatus shown at FIG. 3, which is diagrammatic in nature and which is illustrative of a means for shifting the operative components of the apparatus from one channel to another on the several tapes.

Referring more particularly to the drawing, the showing at FIGS. 1 through 9, illustrates in a somewhat diagrammatic manner, a conventional mode for the collection of seismic data, apparatus for processing such data and certain results which may be obtained by the processing, all of which constitutes a background and an environment in which the present invention may be used.

Field seismic reflection data may be obtained somewhat as in the manner illustrated at FIG. 1, where a number of stations 25 are located at the ground surface at selected distances apart. Each station is prepared by drilling a shallow hole through the weathered surface mantle and to a substantially solid earth formation. A geophone 26 is set in the bottom of each hole to receive seismic earth tremors and transmit the same to a field recording apparatus 27. Such a recorder includes a cylindrical tape-receiving drum 28 and a magnetic recording head 29. A field magnetic tape 30 is mounted upon the drum 28 and receives and records a trace of earth tremors on a circumferential path on the drum and at a longitudinally disposed channel 31 on the field tape 30, the channel depending upon the position of the recording head 29 with respect to the drum.

In using this equipment, a geophone is removed from a selected hole and a shot, usually a charge of nitroglycerin, is exploded at the base of the hole. The seismic effects of this shot are recorded at the adjacent stations. Such reflections will be recorded at stations adjacent to the shot, with the reflections being indicated as by the broken lines 32 at FIG. 1. Such effects include noise, erratic earth movements and also reflections of a longitudinal seismic wave initiated by the shot. This wave will reflect from hard and well-defined strata at various depths, as where the formation changes from shale to sandstone.

It is immediately apparent that the reflections of a wave from the several formations and to a given station, will be below an intermediate location reflection point 33. It is also apparent that if the stations 25 are properly positioned, the seismic reflections of several shots, each at a different station, may be recorded at other stations in such a manner as to obtain a number of recordings with reference to a common reflection point. In this manner, seismic data for the given location, the common reflection point may be obtained on field tapes 30 from the several different stations. While such data is cumulative, it may be combined to give a reliable and a reasonably precise indication of the nature of the underground strata at the reflection point.

Apparatus to process the filed magnetic tapes 30 and to reproduce corrected information on transfer tapes or as oscillographic charts, is commonly called geo-data magnetic recording systems and a conventional arrangement of such apparatus is illustrated at FIG. 3. This processing apparatus 34 is formed as a group of cabinets including a magnetic recorder cabinet 35 and other control cabinets. This magnetic recorder cabinet includes a field tape drum 36, a transfer tape drum 37 and an oscillographic drum 38. All of these drums are interconnected and are mounted upon a common shaft 39, which may include an extension to a supplementary recorder cabinet 40 having drum 36a of a different size adapted to fit and receive a field tape of a different type and style than that which the drum 36 is adapted to fit. The control cabinets may be designated as a right function cabinet 41, a left function cabinet 42, a right control cabinet 43 and a left control cabinet 44. These cabinets contain circuits, mechanisms and adjusting dials to introduce corrections between the field tapes and the transfer tapes or oscillographic charts to account for weathering and elevation corrections, normal moveout corrections and spread configuration adjustments. The conventional circuit arrangements within the cabinets are interconnected with the magnetic recorder cabinet as circuit leads 45. These circuits terminate at magnetic receiving and recording heads at the several channels of the magnetic drums and at an oscillographic scribing pen, all in a conventional manner, which is not shown and need not be further described.

A typical field tape 30a of a type which is adapted to be used wtih the drum 36a is illustrated at FIG. 4 with magnetic traces at several channels 31 being indicated by broken lines. This tape has suitable connection holes 46 at one end for attachment to studs either on a field drum or the drum 36a at a proper position to correctly obtain and reproduce the information on the several channels of the tape.

The tape illustrated at FIG. 5 may serve either as a field tape 30 or transfer tape 47 and will be henceforth described as a transfer tape which is adapted to be mounted upon the transfer tape drum 37. The transfer tape drum is preferably of a type which includes a circumferential array of guide pins 48 about the drum including a two-piece lock pin group or assembly 48a at the starting point of the drum rotation. These pins are adapted to position and hold the tape onto the drum as clearly illustrated at FIG. 8. The transfer tape 47 is formed with a longitudinal array of orifices 49 which fit upon the pins 48 and an end slot 50 which fits upon and is held in position by the lock pin 48a as illustrated at FIG. 9.

An analysis of the information at each channel of a magnetic tape 47 is best illustrated by an oscillographic trace of the channel. After the field data is corrected and transfered to a transfer tape 47 it is ready to be repoduced by an oscillograph. FIGS. 6 and 7 illustrate typical oscillographic traces which may be obtained from correlated traces on the transfer tape. FIG. 6 illustrates the type of traces which are obtained at different stations for a common reflection point and FIG. 7 illustrates the form of a curve which may be obtained by combining and adding a group of curves such as those illustrated at FIG. 6. These traces will be hereinafter further described in connection with the use of the present invention.

The present invention is based upon using a continuous transfer tape 51 having a length which is a selected multiple of the circumference of the transfer tape drum 37 to define a corresponding number of stages 52 along the course of the continuous tape. This continuous tape is of the same material as is a conventional magnetic tape, however, its ends 53 are joined together to make it continuous in operation. Each stage of the tape 51 is similar in appearance to that of a conventional tape with a longitudinal array of spaced orifices 49a in locations corresponding with and identical to the orifices 49 of a conventional tape to permit these orifices 49a to snugly fit upon the pins 47 of the transfer drum. Each stage also terminates with a slot 50a which is, however, oversized as compared with a conventional end slot 50 to loosely fit over the lock pin 48a.

In operation of this continuous tape 51, it is manifest that it must be snugly wrapped about a portion of the transfer tape drum 37 with one side thereof feeding upon the drum and the other side being payed from the drum. To hold this tape in registration and alignment at all times it is essential that the pins 47 be used not only as lateral guides on the drum but also as circumferential spacers. Moreover, the pins 47 must be comparatively short and their ends must be rounded to permit the tape 51 to drop onto or lift away from a pin 47 as it is being wound onto or payed away from the drum. The rounded end of the comparatively short pin permits the lifting action as illustrated in broken lines at FIG. 13. On the other hand, when feeding and paying the continuous tape onto and off from the drum 37 it is important that the lock pin 48 does not function and the oversized slot 50a permits the lock pin 48 to lie in the slot when the tape is on the drum but to freely move out of the slot as in the manner indicated at FIG. 14, when the tape is moving onto or away from the drum.

Twenty-four or more stages 52 of the continuous transfer tape may be required to properly service a group of field tapes and shift the information from the various channels of each field tape to a single channel on the continuous transfer tape in a continuous manner. A tape of the required length for this purpose is extremely cumbersome to handle and the problem of feeding it onto and paying it off from the transfer drum involves a complex operation. It is necessary to hold the tape in precise alignment, in a plane normal to the axis of the drum and with a moderate tension upon both the infeed and outfeed reaches of the tape adjacent to the drum. An improved apparatus developed for handling this tape is illustrated at FIGS. 15 to 21. The apparatus is formed upon a framework 54 adapted to properly support a container 55 which holds the bulk of the tape, an infeed guide mechanism 56 adapted to hold the tape moving onto the transfer drum 37 under a moderate tension and in precise alignment with respect to the transfer drum 37, and an outfeed mechanism 57 adapted to remove the tape from the drum 37 and return it to the container 55, all as hereinafter described in detail.

The framework 54 includes a base 58 adapted to set upon the floor adjacent to the processing apparatus and a bent 59 which is formed as structural channel members as an inverted U. This bent upstands from the base 58 to hold other elements of the tape handling apparatus and extends upwardly to a level above the axis of the transfer drum. The bent is oriented to face the drum and is centered with respect to the transfer drum so that the infeed and outfeed mechanisms which are supported by the bent may be precisely aligned with the drum. A suitable link 60 connects this bent 59 to the sidewall of the magnetic recorder cabinet 35 and this and other means may be used to hold the framework in a proper position with respect to the drum 37.

The container 55 is formed as a narrow, box-like unit slightly wider than the continuous transfer tape. It is positioned between the legs of the bent 59 with the sidewalls 61 lying in spaced parallelism and in planes normal to the axis of the transfer tape drum 37. These sidewalls upstand from the base 58 and are secured to filler blocks 62 on the legs of the bent 59 as with wood screws 63 or the like. The outer end wall 64, at the end of the container remote from the apparatus is substantially vertical while the inner wall 65, next to the apparatus lies between the sidewalls to slope downwardly and outwardly to terminate as a curved bottom 66 as clearly illustrated at FIG. 16. This sloping inner wall 65 and bottom portion 66 shapes the cavity of the container in a manner which permits the tape to fold upon itself as a group of convolutions, especially when a large amount of tape is payed into the container. The tape is payed into the container at the sloping inner wall 65 and pulled out of the container next to the outer wall 64, with a continuous array of convolutions forming within the container, as in the manner clearly illustrated at FIG. 16. The tape thereby moves into and out of the container smoothly without snarling, kinking or binding.

The infeed guide mechanism 56 is adapted to receive the tape at the top of the container at a point near the outer wall 64. In sequence the tape moves onto an upwardly sloping guide plate 67 and through an alignment slot 68 which is formed in a face plate 69 mounted on the bent 59. Thence, the tape extends over an idle roll 70 which is mounted between the upright legs of the bent 59. Thence, the tape turns downwardly to lie upon a downwardly sloping guide plate 71 and to extend through a second positioning and alignment slot 72 which is formed in a face plate 73 upstanding from the lower end of the guide plate 71. Thence, the tape moves about a second idle roll 74 which lies adjacent to the drum 37, and the tape 51 extends from this idle roll 74 upwardly and onto the drum 37.

The first mentioned guide plate, plate 67 has its upper end mounted onto the face plate 69 and its lower end mounted onto the upper portion of and between the sidewalls 61. The downwardly sloping guide plate 71 has its upper end mounted onto a cross bar 75 and its lower end mounted onto a pair of sloping struts 76 which outstand from the bent 59. The upper end of each strut 76 is connected to the bent and its lower end is connected to a suitable panel portion on the magnetic recorder cabinet 35 as by a connective clip 77. The face plate 73 is also mounted between the struts 76 and a bearing block 78 upstands from the lower end of each strut 76 to support an end of the idle roll 74.

The continuous transfer tape 51 will move about the idle roll 74 with the orifices 49 registering over the guide pins 48 as hereinbefore described. It is essential that this tape be held in substantially perfect alignment and under moderate tension to facilitate this registering movement of the orifices upon the pins. The alignment is accomplished by the slots 68 and 72 and the tensioning is accomplished by slide blocks 79 which are mounted upon the guide plates 67 and 71 as between edge flanges 80 upstanding from the edges of the plates 67 and 71. The downward sliding movement of each block is restricted as by a stop pin 81 near the lower end of the flanged edges 80. The opposing surfaces of the guide plates and slide blocks between which the tape moves are suitably polished and smoothed to prevent the tape from being damaged as it moves between them. The size and weight of the slide blocks 79 also may be adjusted to produce any desired frictional pull upon the tape as it moves onto the drum 37.

The outfeed guide mechanism 57 is adapted to pull the tape from the drum with a moderate tension. It includes a guide plate 82 which extends from a point near the base of the drum 37 and to the bent 59, with the outer end being supported by the struts 76 and the inner end being supported by a cross bar 83 attached to the bent 59.

The transfer tape moves from the drum 37 onto this guide plate 82, thence, about a drive roll 84 which is mounted between the legs of the bent 59. It moves about this drive roll with a half-wrap to pass between the guide roll and a pressure roll 85, and thence about a portion of the pressure roll to drop into the container 55 adjacent to the inner wall 65, as in the manner clearly illustrated at FIG. 16.

The several rolls, 70, 74, 84 and 85 are formed with end shaft segments 86 which are mounted in conventional ball type bearings 87 or the like. The bearings 87 of the idle roll 70 and the drive roll 84 are affixed to the vertical legs of the bent and the bearings of the idle roll 74 are affixed to the blocks 78. The bearings 87' of the pressure roll however, are slidably mounted in slotted portions 88 in the vertical legs of the bent 59 and are urged upwardly by compression springs 89 mounted upon suitable clip angles 90 affixed to the bent legs below the bearings as in the manner illustrated at FIG. 17.

One shaft segment 86' of the drive roll 84 extends through its bearing and is connected with a shaft of a drive motor 91 which is mounted upon a suitable base 92 outstanding from the leg of the bent, as in the manner clearly illustrated at FIG. 17. This motor is preferably of a variable-torque geared type of any conventional make which has its output shaft operable at a selected reduced speed. It is geared to provide a rate of rotation when under no load which rotates the drive roll 84 at a speed which would take up the tape 51 somewhat faster than it can move from the transfer drum 37. Therefore the motor must operate at a slightly reduced speed and under a small load such that the drive roll pulls the tape as it is payed off the drum. This pull on the tape is sufficient to offset the drag of the tape when it passes through the infeed guide mechanism and thereby avoids creating any resultant rotative drag or pull which will effect the normal rotation of the transfer drum.

FIGURES 22, 23 and 24 illustrate in further detail a method of shifting the information from several field tapes 30a onto a continuous transfer tape 51 according to the principles of the invention. FIGURE 24 is a diagrammatic view of a portion of a conventional channel-shifting mechanism 100 in one of the control cabinets of the processing apparatus. This mechanism operates to shift the recording and transfer action of the magnetic heads of the apparatus from one channel to another. The field tape control 101 includes a series of circuit contacts 102 which connect with proper magnetic heads of the several data trace channels 31 in the field tape and a switch arm 103 which moves from one channel to the next in ordinary operations. The transfer tape control 104 includes a series of circuit contacts 105 which connect with the several channels of the transfer tape and a switch arm 106 which moves from one channel to the next in ordinary operations.

In the method practiced in the present invention it is contemplated that the field tape switch arm 103 will not move from one contact to the next in a sequential manner but will be shifted from one contact to another contact which may not be in sequence with the first, but will be at a predetermined location depending upon the nature of the field operations in setting up the original shot pattern. The transfer tape switch arm may be arranged to shift from one contact to the next in sequential manner if desired. However, it will remain at a given contact throughout a complete cycle of the transfer tape 51 to record at a given channel of the transfer tape all of the information from a given field tape in a sequence. Illustrative of such operation, the field tapes 30A, 30B, and 30C illustrated at FIG. 22 are marked to indicate three selected channels on each tape, on tape 30A, channels *a*, *b* and *c*, on tape 30B, channels *a'*, *b'* and *c'* and on tape 30C, channels *a''*, *b''* and *c''*. Where the trace data is obtained in the field as in the manner heretofore described, and where the traces *a*, *a'* and *a''*, *b*, *b'* and *b''*, and *c*, *c'* and *c''* correlate, the respective traces may be at channels in their respective field tapes which are completely out of order when one is compared with the other, as in the manner illustrated at FIG. 22.

The corrected information from the several channels of a field tape is reproduced in a single channel of the transfer tape with the information of each channel of the field tape being reproduced in a single stage of the continuous transfer tape. The order in which the channels of the field tape is taken for this sequential transfer may be irregular. In operation of the unit the transfer tape switch arm 106 first placed at a given contact 105 and it remains at this contact while the switch arm 103 will shift from one contact 102 to another in an irregular manner.

It follows that by setting switch arm 106 to a first contact 105, the traces *a*, *b* and *c* of the field tape 30A may be transferred to the first channel of the transfer tape in sequential stages as illustrated at FIG. 23. In such a manner all of the data on the field tape 30A is corrected and transferred without removing the field tape from the drum 36 or 36a of the apparatus. A minimum of corrective settings is required as the arm 103 swings from contact to contact to shift from one channel and another. Next, in the same manner, switch arm 106 is shifted to a second contact 105 and the traces *a'*, *b'* and *c'* are transferred to the second channel of the transfer tape in proper correlated successive stages. Next, the switch arm 106 is shifted to a third contact 105 and the traces *a''*, *b''* and *c''* are transferred to the third channel of the transfer tape in proper correlated successive stages. The correlated traces thus obtained at each stage of the transfer tape may be then transferred to the oscillograph tape to produce a composite of traces similar to that shown at FIG. 6, or the correlated group may be electronically added to produce a finished trace similar to that shown at FIG. 7.

It is further apparent that the continuous transfer tape may be used with the processing apparatus in other ways than that above described and that the substance of the method so disclosed will encompass like operations of varied scope. Also, it is obvious that others skilled in the art can devise and build other alternate and equivalent components and apparatus which are within the spirit and scope of my invention, hence, I desire that my protection be limited, not by the operations and constructions illustrated and described, but only by the proper scope of the appended claims.

I claim:

1. The combination with geophysical data processing apparatus having a field-tape drum adapted to hold a multi-channeled seismic field tape, a transfer-tape drum adapted to hold a multi-channeled transfer tape and to rotate with the field-tape drum and means adapted to pick up seismic indications in a selected channel of a field tape as the drums rotate, to correlate, shift and otherwise process the seismic indications and to transfer the modified and processed seismic indications to a selected channel on a transfer tape, of; a continuous transfer tape having a plurality of successive multi-channel stages and means adapted to feed the continuous tape onto, about and off from the transfer tape drum, whereby processed seismic indications from the channels of a field tape may be transferred sequentially and successively onto a selected channel of each successive stage of the continuous transfer tape.

2. The combination with geophysical data processing apparatus having a field-tape drum adapted to hold a multi-channeled seismic field tape, a transfer-tape drum adapted to hold a multi-channeled transfer tape and to rotate with the field-tape drum and means adapted to pick up seismic indications in a selected channel of a field tape as the drums rotate, to correlate, shift and otherwise process the seismic indications and to transfer the modified and processed seismic indications to a selected channel on a transfer tape, of; a continuous, end-connected transfer tape of successive multi-channel stages in a closed circuit arrangement with the length of each stage corresponding to the circumference of the transfer tape drum, and with the total circuit length of the transfer tape being an even multiple of the transfer tape drum circumference with a portion of said tape being adapted to extend about the transfer tape drum and means adapted to feed the transfer tape onto, about and from the transfer tape drum whereby processed seismic indications from the channels of a field tape may be transferred, sequentially and successively, and from an initial stage, to a selected channel of each successive stage of the continuous transfer tape and the transfer tape is adapted to circuit and return to the start of the initial stage.

3. In the combination defined in claim 2, wherein the circuit length of the continuous transfer tape is sufficient to define a stage for each operative channel on a field tape.

4. In the combination defined in claim 2, including register means on the transfer tape drum and correlated register means on the transfer tape adapted to interengage whereby to repeatedly place the transfer tape at a selected drum position as the tape repeatedly completes a circuit about the drum.

5. In the combination defined in claim 2, including a circumferential array of spaced register pins and a lock pin on the transfer tape drum and wherein the transfer tape includes a series of regularly spaced orifices adapted to snugly engage the register pins and enlarged end slots adapted to embrace but not to engage with the lock pin as the transfer tape moves onto, about and from the drum.

References Cited by the Examiner

UNITED STATES PATENTS

| | | | |
|---|---|---|---|
| 2,578,133 | 12/51 | Hawkins | 346—33 |
| 2,803,515 | 8/57 | Begun et al. | 346—74 |
| 2,876,428 | 3/59 | Skelton et al. | 340—15.5 |
| 2,928,070 | 3/60 | Palmer et al. | 340—15.5 |
| 2,958,849 | 11/60 | Begun | 340—172.5 |
| 2,975,399 | 3/61 | Burns | 340—15.5 |
| 2,986,722 | 5/61 | Williams | 340—15.5 |
| 3,039,558 | 6/62 | Romberg | 181—0.53 |
| 3,041,578 | 6/62 | Elliott | 340—15.5 |
| 3,041,610 | 6/62 | Hibbard | 346—33 |
| 3,047,836 | 7/62 | Johnson et al. | 340—15.5 |
| 3,048,846 | 8/62 | Martin | 346—1 |
| 3,050,731 | 8/62 | Usdin | 346—1 |
| 3,051,926 | 8/62 | Boice et al. | 340—15.5 |
| 3,061,813 | 10/62 | Geyer | 340—15.5 |
| 3,079,604 | 2/63 | Schwarzer | 346—136 |
| 3,097,562 | 7/63 | Gurrola et al. | 88—24 |
| 3,109,156 | 10/63 | Anderson | 340—15.5 |
| 3,113,823 | 12/63 | Phillips | 346—136 |
| 3,123,799 | 3/64 | Shook | 340—15.5 |

LEYLAND M. MARTIN, *Primary Examiner.*